April 8, 1924.
C. E. TIMSON
ANIMAL MARKER
Filed March 8, 1920
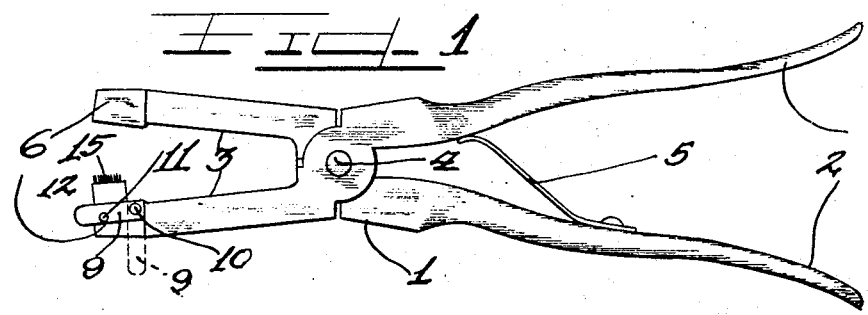
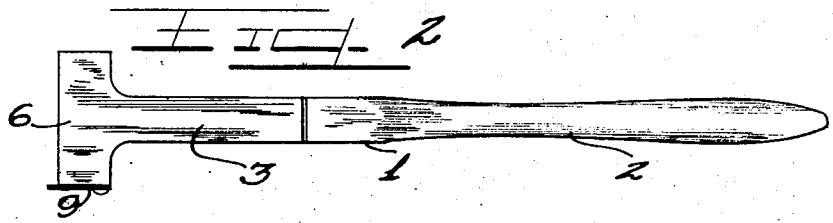
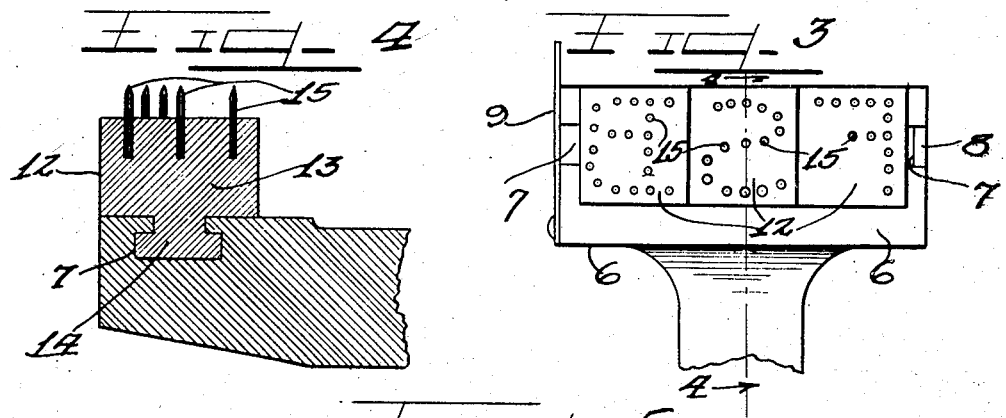
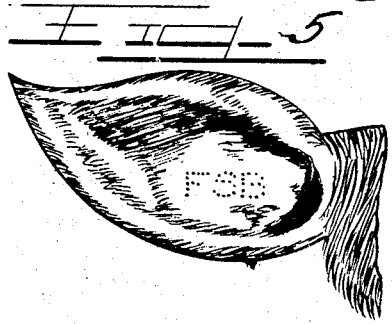
Inventor
Charles E. Timson Patented Apr. 8, 1924.

1,489,558

UNITED STATES PATENT OFFICE.

CHARLES E. TIMSON, OF CHICAGO, ILLINOIS.

ANIMAL MARKER.

Application filed March 8, 1920. Serial No. 364,078.

*To all whom it may concern:*

Be it known that I, CHARLES E. TIMSON, a citizen of the United States, and a resident of the city of Chicago, in the county of Cook and State of Illinois, have invented certain new and useful Improvements in Animal Markers; and I do hereby declare that the following is a full, clear, and exact description of the same, reference being had to the accompanying drawings, and to the numerals of reference marked thereon, which form a part of this specification.

This invention relates to animal markers and more particularly to that type of markers which are employed in the tattoo method of animal identification.

The necessity of marking each individual animal in the herd has long been recognized by stockmen. This need is especially apparent in the case of registered animals where it is imperative that a positive, permanent method of identification be provided to connect up with the written registration.

Many methods have been adopted to effect this necessary identification, among them being "branding", and the use of metal markers. It is possible, however, to easily change a "brand" and the process of burning is both expensive and inhumane. Metal markers, which have been heretofore largely used, are liable to become lost and when they are used frequent inspections are necessary for this reason.

The process of tattooing, or marking with ink under the skin of the animal, provides a method of identification which is permanent, humane, and which, by the use of the marker embodying this invention, is inexpensive.

It is an object of this invention to provide an animal marker adapted to be used in the tattoo process of animal identification.

It is a further object of this invention to provide a tattoo animal marker adapted to make a predetermined identification mark on an animal with a single operation.

It is an important object of this invention to provide a tattoo animal marker having a plurality of removable interchangeable marking characters from which various identification combinations may be formed.

Other and further important objects of this invention will be apparent from the disclosures in the drawings and specification.

The invention (in a preferred form) is shown on the drawings and hereinafter more fully described.

On the drawings:

Figure 1 is a view in side elevation of an animal marker embodying the principles of this invention.

Figure 2 is a top plan view thereof.

Figure 3 is a fragmentary view in elevation showing the marking characters arranged in position in the jaw of the animal marker of this invention.

Figure 4 is a section on line 4—4 of Figure 3.

Figure 5 is a perspective view of the inside of an animal's ear that has been tattooed with the marker of this invention.

As shown on the drawings:

The marker embodying this invention, which is indicated as a whole by the reference numeral 1, comprises the handles 2 and the jaws 3, which are pivoted together at 4 by the well-known method used in pincer or tong construction. The leaf spring 5, which is secured to the inside of one of the handles 4 and slidably engages the inside of the opposite handle acts to normally hold said handles and the jaws 3 separated. The jaws 3 are provided at their outer ends with integral transverse extensions 6, one of said extensions being provided with a groove 7 in the inner surface thereof. As shown in Figures 3 and 4, the groove 7 extends longitudinally of the extension 6, and, as shown, said groove is of greater width at the bottom than at the opening thereof. One end of the groove 7 is normally partially closed by the detent 8, which is preferably integral with the extension 6. For closing the opposite end of the groove 7 a spring detent 9 is pivoted at the end of the extension 6 on the pin 10. The projection 11 on the extension 6 engages an aperture in the detent 9 to secure it in closed position.

The tattoo type 12 are secured to the extension 6 between the detents 8 and 9. Said tattoo type comprise the body portion 13 and the projection 14, said body portion and projection being preferably constructed of type metal or other soft metal, and the projecting tattoo needles 15, which are molded in the body portions 13 after being arranged to form the desired character. As shown in Figure 4, the projections 14 are formed to fit in the groove 7 so that the tattoo type 12 are slidable in the groove but can only be removed from the end thereof.

Each tattoo type 12 may bear a separate character or a solid type bar containing a predetermined mark or arrangement of characters may be used. In case the type bar is longer than the extension 6, the spring detent 9 may be left open as shown in dotted lines in Figure 1. If only a single tattoo type is used, blank type may be used for holding it in position.

The operation is as follows:

The tattoo identification mark is ordinarily placed on the inside of the animal's ear, as shown in Figure 5. The desired characters or tattoo type are arranged in the groove 7 and are secured in position therein by the spring detent 9. The spot that is to be marked is thoroughly cleaned and the ear of the animal is inserted between the jaws of the marker with the letters or figures on the inside of the ear. The characters are positioned over the prepared spot and the jaws are closed quickly and firmly, the needles 15 puncturing the animal's ear. The handles are then released and the marker removed. Prepared tattoo ink is thoroughly smeared over the punctures until every one is filled. When the punctures heal the skin grows over the tattoo ink leaving the desired design or combination of characters permanently tattooed inside the animal's ear. Excess ink soon wears from the surface, leaving only that which is in the punctures and covered with skin.

I am aware that numerous details of construction may be varied through a wide range without departing from the principles of this invention, and I therefore do not purpose limiting the patent granted otherwise than necessitated by the prior art.

I claim as my invention:

An animal marking implement, comprising a pair of members pivoted together, the portions of said members on one side of said pivot constituting handles and the other portions constituting jaws, a spring between said handles normally holding the jaws open, a platen on the free end of one of said jaws, a type carrier on the free end of the other of said jaws in position for cooperation with said platen, said type carrier having a groove transverse to the length of said jaw, a stop at one end of said groove, a pivoted spring closure at the other end of said groove, and type blocks each having a dove-tail projection fitting said groove, said type blocks having on the face opposite said projection, needles secured therein.

In testimony whereof I have hereunto subscribed my name in the presence of two subscribing witnesses.

CHARLES E. TIMSON.

Witnesses:
CARLTON HILL,
EARL M. HARDINE.